(12) United States Patent
Baik et al.

(10) Patent No.: US 9,082,176 B2
(45) Date of Patent: Jul. 14, 2015

(54) METHOD AND APPARATUS FOR TEMPORALLY-CONSISTENT DISPARITY ESTIMATION USING DETECTION OF TEXTURE AND MOTION

(75) Inventors: Aron Baik, Seoul (KR); Ji Won Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 331 days.

(21) Appl. No.: 13/317,109

(22) Filed: Oct. 11, 2011

(65) Prior Publication Data

US 2012/0099767 A1  Apr. 26, 2012

(30) Foreign Application Priority Data

Oct. 25, 2010  (KR) .................. 10-2010-0103977

(51) Int. Cl.
*G06K 9/00* (2006.01)
*G06T 7/00* (2006.01)
*G06T 7/20* (2006.01)

(52) U.S. Cl.
CPC ............. *G06T 7/0022* (2013.01); *G06T 7/2006* (2013.01); *G06T 7/2086* (2013.01); *G06T 2207/10021* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 6,188,777 B1 * | 2/2001 | Darrell et al. | 382/103 |
| 6,269,175 B1 * | 7/2001 | Hanna et al. | 382/107 |
| 6,744,923 B1 * | 6/2004 | Zabih et al. | 382/226 |
| 8,000,392 B1 * | 8/2011 | Krupiczka et al. | 375/240.16 |
| 8,432,434 B2 * | 4/2013 | Veeraraghavan et al. | 348/46 |
| 2003/0107649 A1 * | 6/2003 | Flickner et al. | 348/150 |
| 2004/0095999 A1 * | 5/2004 | Piehl et al. | 375/240.16 |
| 2004/0240725 A1 * | 12/2004 | Xu et al. | 382/154 |
| 2006/0104360 A1 * | 5/2006 | Gordon | 375/240.16 |
| 2010/0111370 A1 * | 5/2010 | Black et al. | 382/111 |
| 2010/0194856 A1 * | 8/2010 | Varekamp | 348/42 |
| 2011/0069064 A1 * | 3/2011 | Zhang et al. | 345/419 |
| 2011/0080466 A1 * | 4/2011 | Kask et al. | 348/43 |
| 2012/0075535 A1 * | 3/2012 | Van Beek | 348/699 |
| 2013/0243313 A1 * | 9/2013 | Civit et al. | 382/164 |

FOREIGN PATENT DOCUMENTS

| | | |
|---|---|---|
| KR | 10-2001-0025045 | 3/2001 |
| KR | 10-2002-0095752 | 12/2002 |
| KR | 10-2006-0601958 | 7/2006 |
| KR | 10-2006-0133764 | 12/2006 |
| KR | 10-2007-0078342 | 7/2007 |
| KR | 10-2008-0051015 | 6/2008 |
| KR | 10-2009-0006080 | 1/2009 |
| KR | 10-2010-0017748 | 2/2010 |
| KR | 10-2010-0061715 | 6/2010 |

* cited by examiner

*Primary Examiner* — Nancy Bitar
(74) *Attorney, Agent, or Firm* — NSIP Law

(57) ABSTRACT

An apparatus and method estimate disparities of pixels in a frame. In order to acquire temporally-consistent disparity maps it is determined whether to enforce a temporal consistency with respect to pixels. In order to determine whether to enforce the temporal consistency, a texture, motion, or a matched motion in the frame may be detected or estimated. A disparity of a pixel where the temporal consistency is enforced may be calculated based on a disparity of a corresponding pixel in a previous frame.

21 Claims, 8 Drawing Sheets

500

600

METHOD AND APPARATUS FOR TEMPORALLY-CONSISTENT DISPARITY ESTIMATION USING DETECTION OF TEXTURE AND MOTION

CROSS-REFERENCE TO RELATED APPLICATIONS

This application claims the benefit of Korean Patent Application No. 10-2010-0103977, filed on Oct. 25, 2010, in the Korean Intellectual Property Office, the disclosure of which is incorporated herein by reference.

BACKGROUND

1. Field

Example embodiments of the following description relate to a method and apparatus for devising a method for estimating disparities from at least two views.

An apparatus and method for acquiring temporally-consistent disparity maps are provided.

2. Description of the Related Art

A computer stereo vision is a part of a computer vision field. Two cameras spaced from each other by a predetermined distance may acquire images from a same scene. An image acquired by a first camera is referred to as a first image, and an image acquired by a second camera is referred to as a second image. An object in the scene may be represented in both the first image and the second image. A disparity means a distance difference between the object in the first image and the object in the second image. Generally, a distance between an object and a camera is inversely proportional to a disparity.

When a third image viewed from a new viewpoint is generated by interpolating the first image and the second image, a disparity may be used to determine a location of an object in the third image.

SUMMARY

The foregoing and/or other aspects are achieved by providing an image processing apparatus to calculate disparities of a plurality of pixels contained in a frame, the image processing apparatus including a temporal constraint unit to determine whether to enforce a temporal consistency with respect to each of the plurality of pixels and to obtain a determination result, and a disparity estimator to estimate disparities of the plurality of pixels based on the determination result, wherein a disparity of a first pixel in the frame where the temporal consistency is determined to be enforced is calculated based on a disparity of a second pixel that is contained in a previous frame and that corresponds to the first pixel.

The disparity of the first pixel may be the same as the disparity of the second pixel.

The image processing apparatus may further include a texture detector to classify each of the plurality of pixels into a texture area where a texture is detected, and a non-texture area where a texture is not detected.

The temporal constraint unit may determine to enforce the temporal consistency to pixels classified as the texture area, and may determine not to enforce the temporal consistency to pixels classified as the non-texture area, among the plurality of pixels.

The image processing apparatus may further include a motion detector to classify each of the plurality of pixels into a motion area where a motion is detected, and a non-motion area where motion is not detected.

The temporal constraint unit may determine to enforce the temporal consistency to pixels classified as the non-motion area, and may determine not to enforce the temporal consistency to pixels classified as the motion area, among the plurality of pixels.

The temporal constraint unit may determine to enforce the temporal consistency to pixels classified as the texture area and the non-motion area, and may determine not to enforce the temporal consistency to pixels classified as the non-texture area or the motion area, among the plurality of pixels.

Each of the plurality of pixels may correspond to a pixel having a same coordinate value as each of the plurality of pixels in the previous frame.

The image processing apparatus may further include a motion estimator to classify each of the plurality of pixels into a matched motion area where motion matched between the frame and the previous frame is detected, and a non-matched motion area where the matched motion is not detected, through a comparison between the frame and the previous frame.

The temporal constraint unit may determine to enforce the temporal consistency to pixels classified as the matched motion area, and may determine not to enforce the temporal consistency to pixels classified as the non-matched motion area, among the plurality of pixels.

When the first pixel is contained in the matched motion area, the second pixel may have a same coordinate value in the matched motion area as a coordinate value of the first pixel.

The temporal constraint unit may determine to enforce the temporal consistency to pixels classified as the texture area and the matched motion area, and may determine not to enforce the temporal consistency to pixels classified as the non-texture area or the non-matched motion area, among the plurality of pixels.

The foregoing and/or other aspects are achieved by providing an image processing method to calculate disparities of a plurality of pixels contained in a frame, the image processing method including determining whether to enforce a temporal consistency with respect to each of the plurality of pixels, and estimating disparities of the plurality of pixels based on the determining, wherein a disparity of a first pixel in the frame where the temporal consistency is determined to be enforced is calculated based on a disparity of a second pixel that is contained in a previous frame and that corresponds to the first pixel.

The image processing method may further include classifying each of the plurality of pixels into a texture area where a texture is detected, and a non-texture area where a texture is not detected.

The determining may include determining to enforce the temporal consistency to pixels classified as the texture area, and determining not to enforce the temporal consistency to pixels classified as the non-texture area, among the plurality of pixels.

The image processing method may further include classifying each of the plurality of pixels into a motion area where motion is detected, and a non-motion area where motion is not detected.

The determining may include determining to enforce the temporal consistency to pixels classified as the non-motion area, and determining not to enforce the temporal consistency to pixels classified as the motion area, among the plurality of pixels.

The determining may include determining to enforce the temporal consistency to pixels classified as the texture area and the non-motion area, and determining not to enforce the temporal consistency to pixels classified as the non-texture area or the motion area, among the plurality of pixels.

The image processing method may further include classifying each of the plurality of pixels into a matched motion area where motion matched between the frame and the previous frame is detected, and a non-matched motion area where the matched motion is not detected, through a comparison between the frame and the previous frame.

The determining may include determining to enforce the temporal consistency to pixels classified as the matched motion area, and determining not to enforce the temporal consistency to pixels classified as the non-matched motion area, among the plurality of pixels.

The determining may include determining to enforce the temporal consistency to pixels classified as the texture area and the matched motion area, and determining not to enforce the temporal consistency to pixels classified as the non-texture area or the non-matched motion area, among the plurality of pixels.

The forgoing in/or other aspects are achieved by providing an image processing apparatus including a temporal constraint unit to determine whether to enforce a temporal consistency with respect to a plurality of pixels in a current frame by calculating a disparity between a pixel in the current frame and a corresponding pixel in a previous frame, and to produce a determination result, and a disparity estimator to estimate disparities of the plurality of pixels in the current frame based on the determination result.

The image processing apparatus may further include a texture detector to classify the plurality of pixels in the current frame into texture areas and non-texture areas, wherein the temporal constraint unit determines to enforce the temporal consistency for pixels in the texture areas.

The image processing apparatus may further include a motion detector to classify the plurality of pixels in a current frame into motion areas or non-motion areas, wherein the temporal constraint unit determines to enforce the temporal consistency for pixels classified as the non-motion areas.

The forgoing and/or other aspects are achieved by providing an image processing method including determining whether to enforce a temporal consistency with respect to a plurality of pixels in a current frame by calculating a disparity between a pixel in the current frame and a corresponding pixel in a previous frame, and estimating disparities of the plurality of pixels in the current frame based on the determining.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
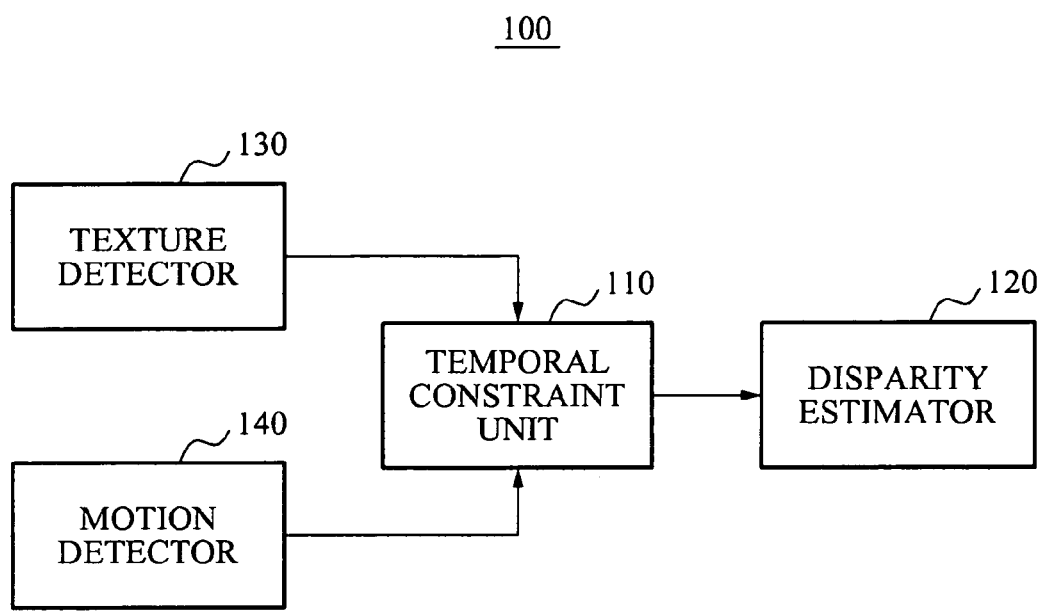
FIG. 1 is a block diagram of an image processing apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

Example embodiments relate to devising a method of estimating disparities from at least two views to acquire temporally-consistent disparity maps.

At least two cameras may individually generate views by capturing an object in predetermined locations. A view may generate frames over time. Frames represent an image generated by capturing an object at a predetermined moment in a predetermined location, namely a location of a view including frames. In other words, the view may be regarded to include at least one frame captured at different photographing times.

All frames may be horizontally arranged based on a location of a view. Such a horizontal axis may be called a spatial domain. All frames may be vertically arranged based on a photographing time. Such a vertical axis may be called a temporal domain.

It is highly likely that neighboring frames in the temporal domain, for example an n-th frame and an (n+1)-th frame in a predetermined view, are similar to each other. In other words, pixels corresponding to each other in neighboring frames may have the same or similar disparity values.

The example embodiments relate to an apparatus and method for enforcing a temporal consistency between neighboring frames in a temporal domain. Enforcement of the temporal consistency refers to estimation of disparities of pixels in a current frame, for example an n-th frame, based on disparities of pixels in a previous frame, for example an (n−1)-th frame. When a set of disparity values of all pixels in a frame is referred to as a disparity map, enforcement of temporal consistency may mean generation of a disparity map of the current frame based on a disparity map of the previous frame.

The example embodiments show an example in which the temporal consistency is to be enforced with respect to pixels satisfying a predetermined condition. A temporal consistency between disparity maps of temporally consecutive frames is important to remove unwanted temporal artifacts from resultants.

The example embodiments may be used with an optional disparity estimation method. An exact mechanism of disparity estimation when at least two views are given may not be a focus of the example embodiments.

The example embodiments may be focused on a method of obtaining temporally-consistent disparity maps by selectively introducing temporally consistent constraints at appropriate locations based on texture information and motion information.

FIG. 1 illustrates a block diagram of an image processing apparatus 100 according to example embodiments.

Referring to FIG. 1, the image processing apparatus 100 may include a temporal constraint unit 110, and a disparity estimator 120. The image processing apparatus 100 may further include a texture detector 130, and a motion detector 140.

The image processing apparatus 100 may calculate disparities of a plurality of pixels included in a frame, namely an image represented by frames.

The temporal constraint unit 110 may determine whether to enforce a temporal consistency with respect to each of the plurality of pixels in the frame. In a temporal domain, pixels in a current frame where disparities are to be estimated may correspond to pixels in a previous frame. Here, the current frame and the previous frame may be, for example, an n-th frame and an (n−1)-th frame.

Enforcement of temporal consistency refers to calculating a disparity of a first pixel in the current frame, based on a disparity of a second pixel that is included in the previous frame and corresponds to the first pixel. In other words, the disparity of the first pixel where the temporal consistency is determined to be enforced may be calculated based on the disparity of the second pixel.

The enforcement of the temporal consistency may mean allocating, to the first pixel, a disparity having a same value as or similar value to the disparity of the second pixel. In other words, the disparity of the first pixel where the temporal consistency is determined to be enforced may be the same as or similar to the disparity of the second pixel.

The enforcement of the temporal consistency may be binary (that is, true or false) or continuously-weighted. When the enforcement of the temporal consistency is binary, the temporal constraint unit 110 may determine whether to enforce the temporal consistency to each of the plurality of pixels in the current frame.

When the enforcement of temporal consistency is continuously-weighted, the temporal constraint unit 110 may determine a level of temporal consistency enforced to each of the plurality of pixels in the current frame. For example, when a high temporal consistency is determined to be enforced to the first pixel, the disparity of the first pixel may have a more similar value to a value of the disparity of the second pixel.

The disparity estimator 120 may estimate a disparity of each of the plurality of pixels based on a determination result obtained by the temporal constraint unit 110. The estimated disparity may be a value used to minimize a predetermined cost function in a local optimization scope or a global optimization scope. Accordingly, the cost function used to estimate disparities by the disparity estimator 120 may be modified to incorporate the above-described temporal constraints, and thus the temporal consistency may be enforced.

An example of a cost function where temporal constraints are incorporated may be represented as given in the following Equation 1:

$$C = C\_matching\_term + C\_smoothness\_term + C\_temporal\_term \quad \text{[Equation 1]}$$

In Equation 1, C denotes a result of the cost function.

Additionally, "matching_term" may have a smaller value as a color error or an intensity error between two correspondences (for example, pixels of a left image corresponding to pixels of a right image in a stereo image) is reduced.

"Smoothness_term" may take on a smaller value as spatially neighboring pixels have more similar disparity values.

"Temporal_term" may take on a smaller value when a current disparity is similar to or the same as a previous disparity, if enforced at all.

Equation 1 is merely an example, and the same principle may be applied to other formulae for disparity estimation.

The temporal constraint unit 110 may determine whether to enforce a temporal consistency with respect to each of the plurality of pixels, based on output results of the texture detector 130 and the motion detector 140.

Hereinafter, the texture detector 130 and the motion detector 140 will be further described with reference to FIG. 2.

Figure 2:
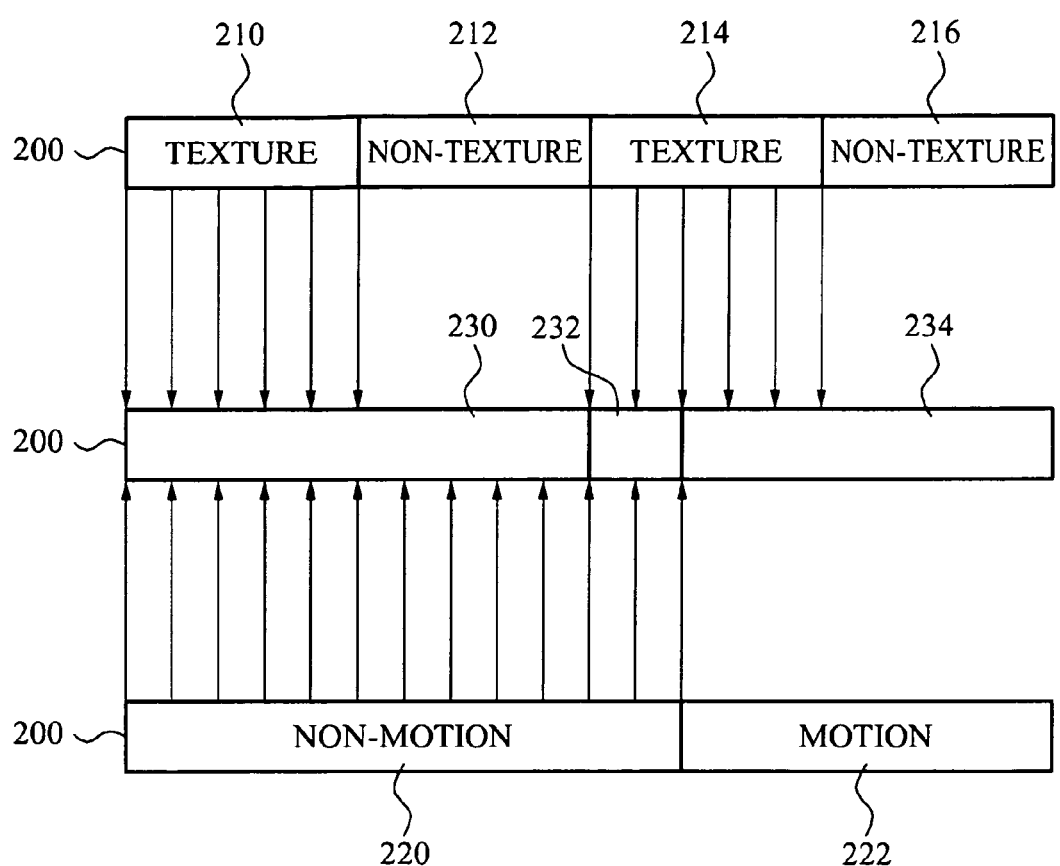
FIG. 2 is a diagram of a temporal constraint determination method according to example embodiments.

FIG. 2 illustrates a diagram of a temporal constraint determination method according to example embodiments. FIG. 2 illustrates a current frame 200, or a portion of the current frame 200 such as a line of the current frame 200.

The texture detector 130 may classify each of a plurality of pixels in the current frame 200 or in a portion of the current frame 200 into texture areas 210 and 214 and non-texture areas 212 and 216. A texture, as the simplest term, refers to a spatial aggregation of gradient magnitude values.

The texture area may be an area of a frame where a texture exists at a ratio equal to or greater than a predetermined threshold value or a threshold. The non-texture area may be an area of a frame where a texture exists at a ratio less than the predetermined threshold value or the threshold ratio. For example, the texture area may be an area in the frame where edges exist at a ratio equal to or greater than a predetermined threshold frequency. The non-texture area may be an area in the frame where edges exist at a ratio less than the predetermined threshold frequency. In the texture area, an unstable disparity estimation result may be obtained. Accordingly, temporal constraints need to be applied to pixels in the texture area.

The temporal constraint unit 110 may determine to enforce the temporal consistency to pixels that are classified as the texture areas 210 and 214 by the texture detector 130, and may determine not to enforce the temporal consistency to pixels classified as the non-texture areas 212 and 216 by the texture detector 130, among the plurality of pixels.

The motion detector 140 may classify each of the plurality of pixels in the current frame 200 or in a portion of the current frame 200 into a motion area 222 and a non-motion area 220.

Motion detection refers to checking for a stationarity of pixels in a spatial neighborhood. The motion area may be an area of a frame where motion is detected. The non-motion area may be an area of a frame where motion is not detected.

A disparity value of a pixel where movement is detected may have changed. Accordingly, the temporal consistency may not be enforced to the pixel. Conversely, a disparity value of a pixel where movement is not detected may be highly likely to remain unchanged.

The temporal constraint unit 110 may determine to enforce the temporal consistency to pixels that are classified as the non-motion area 220 among the plurality of pixels by the motion detector 140, and may determine not to enforce the temporal consistency to pixels classified as the motion area 222.

Additionally, to determine whether to enforce the temporal consistency, the above-described two conditions may be combined. Specifically, the temporal consistency may be enforced to only a pixel where a texture is detected and a movement is not detected.

The temporal constraint unit 110 may determine to enforce the temporal consistency to pixels 232 classified as the texture areas 210 and 214 and the non-motion area 220, and may determine not to enforce the temporal consistency to pixels 230 and 234 classified as the non-texture areas 212 and 216, or the motion area 222, among the plurality of pixels.

To search for a second pixel in a previous frame that corresponds to a first pixel in a current frame, various schemes may be used. For example, the first pixel may correspond to the second pixel having the same coordinate value as the first pixel. In other words, a coordinate value of the first pixel in the current frame may be equal to a coordinate value of the second pixel in the previous frame.

There is a need to examine an example where motion is detected in low-textured areas, namely non-texture areas. In this example, pixels in a spatial neighborhood may mostly remain stationary, and no motion may be detected. However, there is a need not to enforce the temporal consistency. The temporal consistency may be enforced only to pixels in a texture area and a non-motion area and thus, the need may be satisfied.

Figure 3:
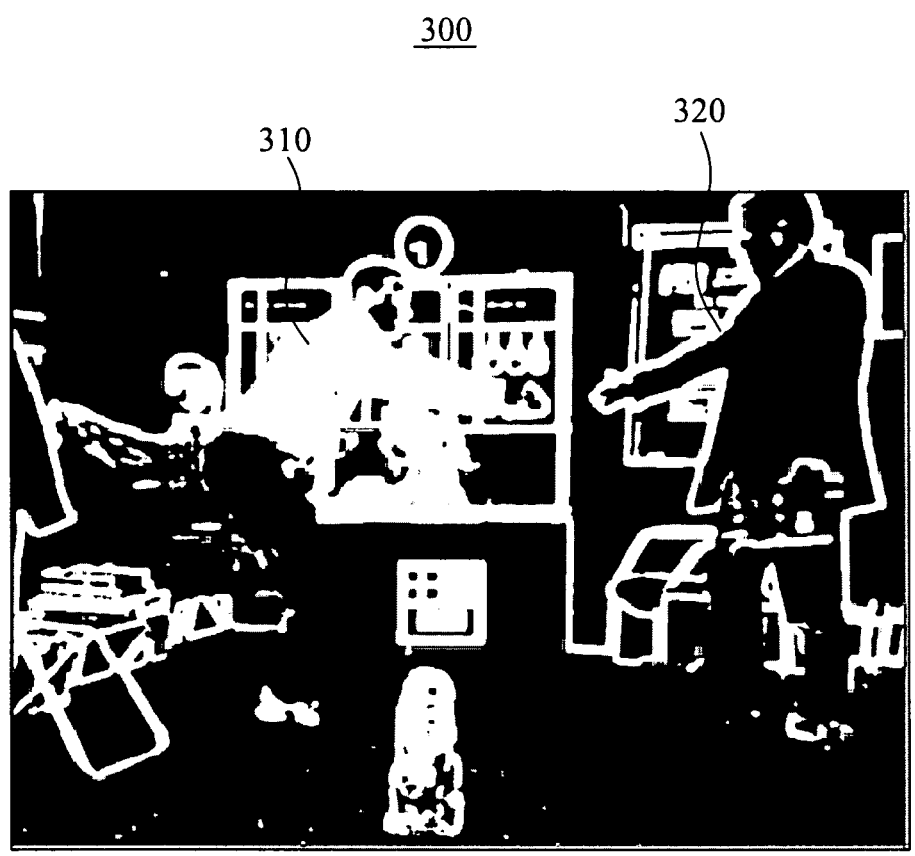
FIG. 3 is a diagram of a result obtained by classifying a frame into a texture area and a non-texture area according to example embodiments.

FIG. 3 illustrates a diagram of a result obtained by classifying a frame into a texture area and a non-texture area according to example embodiments. In FIG. 3, a white portion indicates a texture area, and a black portion indicates a non-texture area. For example, a jacket 310 may correspond to a texture area where a checkered pattern and the like are densely aggregated. A texture such as an edge representing a checkered pattern is densely aggregated and accordingly, the jacket 310 may be classified as a texture area. Additionally, a jacket 320 may have a solid color. A texture is not densely aggregated in a solid color portion and accordingly, the jacket 320 may be classified as a non-texture area.

Accordingly, when the temporal constraint unit 110 determines to enforce the temporal consistency to only pixels that are classified as the texture areas 210 and 214 (see FIG. 2) by the texture detector 130, the temporal consistency may be enforced only to white portions of FIG. 3.

Figure 4:
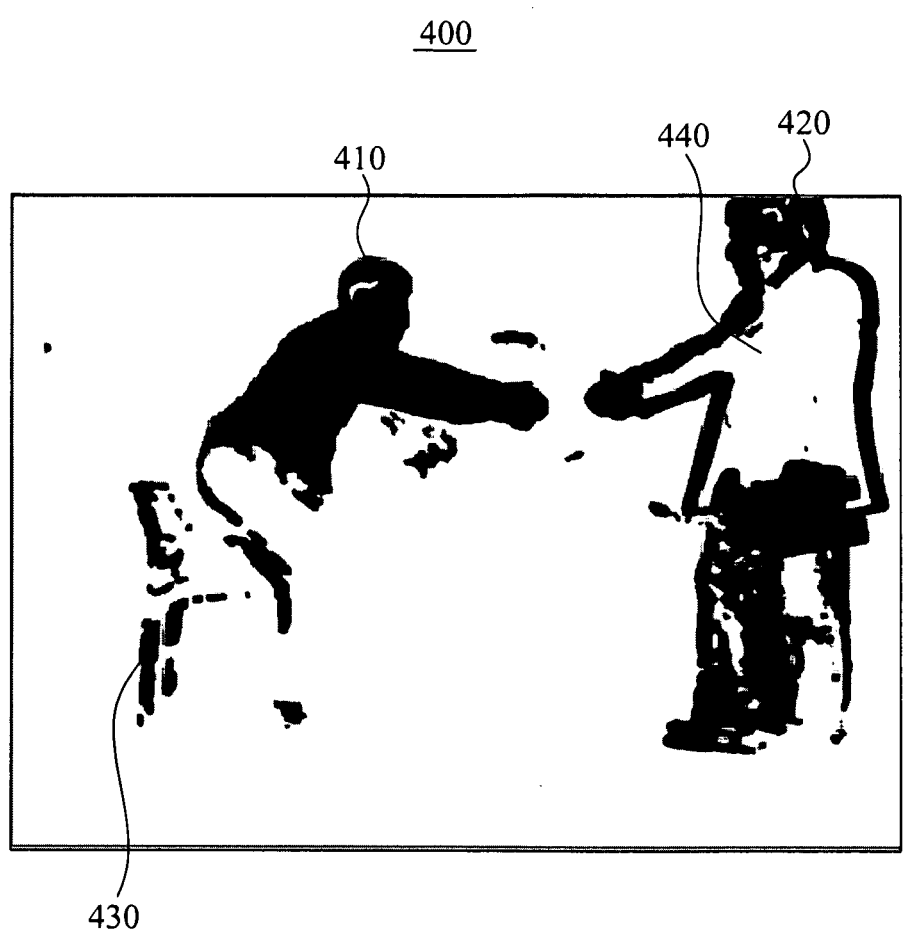
FIG. 4 is a diagram of a result obtained by classifying a frame into a motion area and a non-motion area according to example embodiments.

FIG. 4 illustrates a diagram of a result obtained by classifying a frame into a motion area and a non-motion area according to example embodiments. In FIG. 4, a white portion indicates a non-motion area, and a black portion indicates a motion area.

For example, men 410 and 420 shaking hands with each other, and a chair 430 may be classified as motion areas. However, since a jacket 440 has a solid color, a motion may not be detected in portions other than an outline even when the man 420 moves. Accordingly, the jacket 440 may be classified as a non-motion area.

When the temporal constraint unit 110 determines to enforce the temporal consistency to only a pixel that is classified as the non-motion area 220 (see FIG. 2) by the motion detector 140, the temporal consistency may be enforced only to white portions of FIG. 4.

Figure 5:
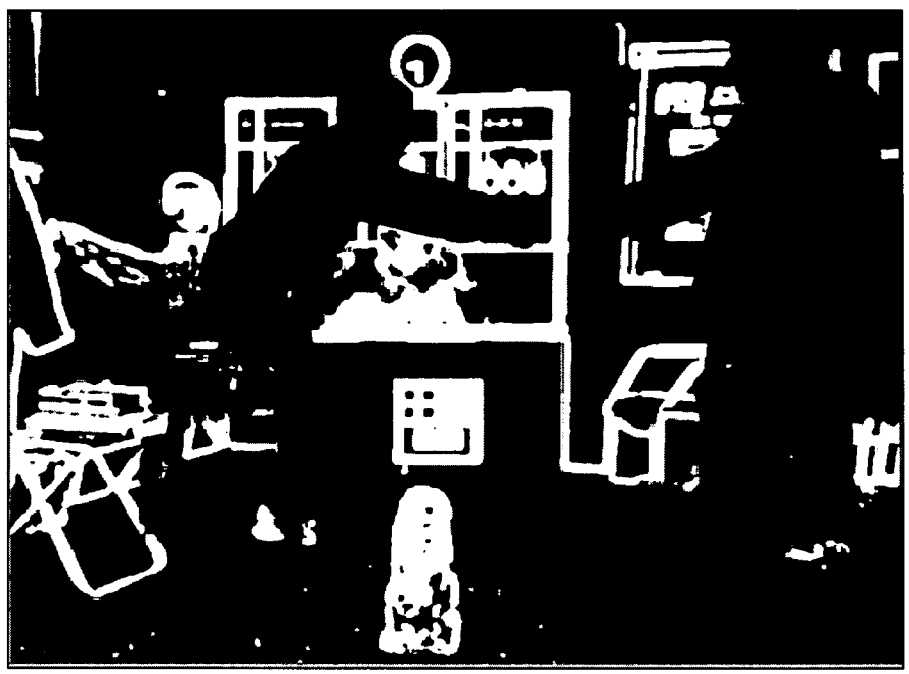
FIG. 5 is a diagram of an area of a frame in which both texture and motion are detected according to example embodiments.

FIG. 5 illustrates a diagram of an area of a frame in which both a texture and a motion are detected according to example embodiments. In FIG. 5, a white portion may be classified as a texture area in FIG. 3, or as a non-motion area in FIG. 4. Additionally, a black portion may be classified as a non-texture area in FIG. 3, or as a motion area in FIG. 4.

Accordingly, when the temporal constraint unit 110 determines to enforce the temporal consistency only to a pixel 232 (see FIG. 2) classified as a texture area and non-motion area, the temporal consistency may be enforced only to white portions of FIG. 5.

Figure 6:
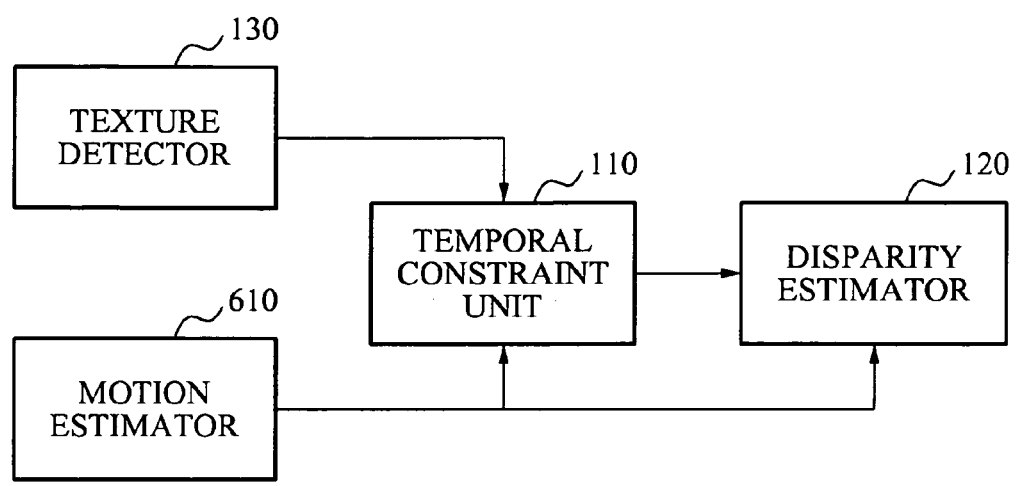
FIG. 6 is a block diagram of an image processing apparatus using motion estimation according to example embodiments.

FIG. 6 illustrates a block diagram of an image processing apparatus 600 using motion estimation according to example embodiments. The image processing apparatus 600 of FIG. 6 may include a temporal constraint unit 110, a disparity estimator 120, and a motion estimator 610. The image processing apparatus 600 may further include a texture detector 130. The temporal constraint unit 110, the disparity estimator 120, and the texture detector 130 of FIG. 6 have been described with reference to FIGS. 1 and 2 and accordingly, further descriptions thereof will be omitted. Hereinafter, the motion estimator 610 will be further described with reference to FIG. 7.

Figure 7:
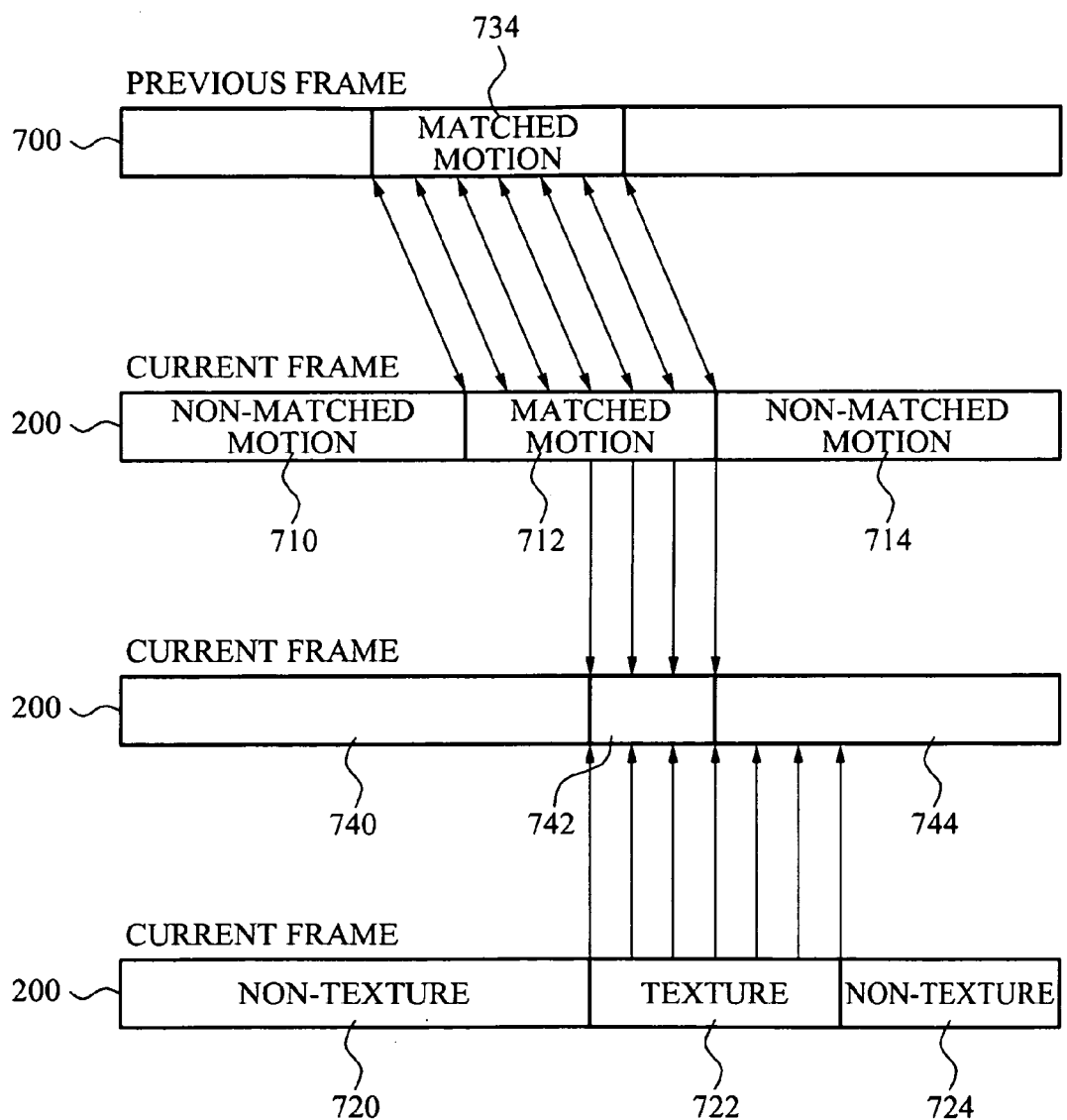
FIG. 7 is a diagram of a temporal constraint determination method based on motion detection according to example embodiments.

FIG. 7 illustrates a diagram of a temporal constraint determination method based on motion detection according to example embodiments. In the embodiment described with reference to FIG. 2, one of the requisites for enforcement of temporal consistency is that motion is not detected in a pixel. Such a scheme may be suitable for a large number of applications. However, the scheme may be restrictive to some specific applications. Accordingly, the example embodiments may provide a scheme of enforcing a temporal consistency to a pixel where a motion is detected.

FIG. 7 illustrates a current frame 200 or a portion of the current frame 200 such as a line of the current frame 200, and a previous frame 700 or a portion of the previous frame 700 such as a line of the previous frame 700.

The motion estimator 610 may detect a matched motion by comparing the current frame 200 (or a portion of the current frame 200) with the previous frame 700 (or a portion of the previous frame 700). The matched motion may refer to movement of a first portion in a previous frame (namely, a portion of pixels in the previous frame) to a second portion of a current frame. For example, a current frame and a previous frame include pixels representing a moving object, a portion of the current frame that indicates the object may correspond to a portion of the previous frame that indicates the object, and a matched motion may be detected from the two portions or from pixels forming the two portions.

The motion estimator 610 may classify each of the plurality of pixels in the current frame 200 into a matched motion area 712 and non-matched motion areas 710 and 714, through a comparison. The matched motion area 712 may be an area of the current frame 200 where a motion matched between the current frame 200 and the previous frame 700 is detected. The non-matched motion areas 710 and 714 may be areas of the current frame 200 where a motion matched between the current frame 200 and the previous frame 700 is not detected.

Motion estimation may include a sort of fidelity metric. Accordingly, the motion estimator 610 may qualify an estimated motion only if it is quite certain that it is accurate. Specifically, the motion estimator 610 may numerically measure an accuracy of motion estimated with respect to a predetermined area. When the accuracy is equal to or greater than a predetermined threshold value, the motion estimator 610 may classify the predetermined area, namely a plurality of pixels in the predetermined area, as a matched motion area.

The temporal constraint unit 110 may determine to enforce the temporal consistency to pixels that are classified as the matched motion area 712 among the plurality of pixels by the motion estimator 610, and may determine not to enforce the temporal consistency to pixels classified as the non-matched motion areas 710 and 714.

The example embodiments may be used together with the above-described texture detector 130. More specifically, the temporal consistency may be enforced only to a pixel where a texture and high-fidelity motion are detected. In other words, the texture detector 130 may classify each of the plurality of pixels in the current frame 200 or in a portion of the current frame 200 into a texture area 722 and non-texture areas 720 and 724.

The temporal constraint unit 110 may determine to enforce the temporal consistency to a pixel 742 classified as the texture area 722 and the matched motion area 712, and may determine not to enforce the temporal consistency to pixels 740 and 744 classified as the non-texture areas 720 and 724 or as the non-matched motion areas 710 and 714.

Information regarding time constraints used for disparity estimation may be similar to those described in the above example embodiments. Pixels in the matched motion area 712 of the current frame 200 may correspond to pixels in a matched motion area 734 of the previous frame 700. As described above, when the temporal consistency is enforced to a first pixel in the matched motion area 712 in the current frame 200, the disparity estimator 120 may determine a second pixel in the previous frame 700 that corresponds to the first pixel, based on a matched motion. In other words, temporal consistency may be enforced based on a disparity of a pixel displaced by a movement in a previous frame.

For example, each of the pixels in the matched motion area 712 among the plurality of pixels in the current frame 200 may correspond to a pixel having the same coordinate in the matched motion area among the pixels in the matched motion area 734 of the previous frame 700.

For example, when a disparity of a first pixel in a current frame where the temporal consistency is determined to be enforced, is calculated based on a disparity of a second pixel that is contained in a previous frame and that corresponds to the first pixel, and when the first pixel is included in a matched motion area, the second pixel may have a same coordinate value in the matched motion area as a coordinate value of the first pixel. Accordingly, the motion estimator 610 may provide the disparity estimator 120 with information regarding the motion area matched between the current frame and the previous frame.

Functions of the temporal constraint unit 110, the disparity estimator 120, the texture detector 130, the motion detector 140, and the motion estimator 610 may be performed by a controller (not illustrated). Here, the controller may include, for example, a single chip or multiple chips, a processor, or a core. Each of the temporal constraint unit 110, the disparity estimator 120, the texture detector 130, the motion detector 140, and the motion estimator 610 may represent a function performed by the controller, a library, a service, a process, a thread, or a module.

Figure 8:
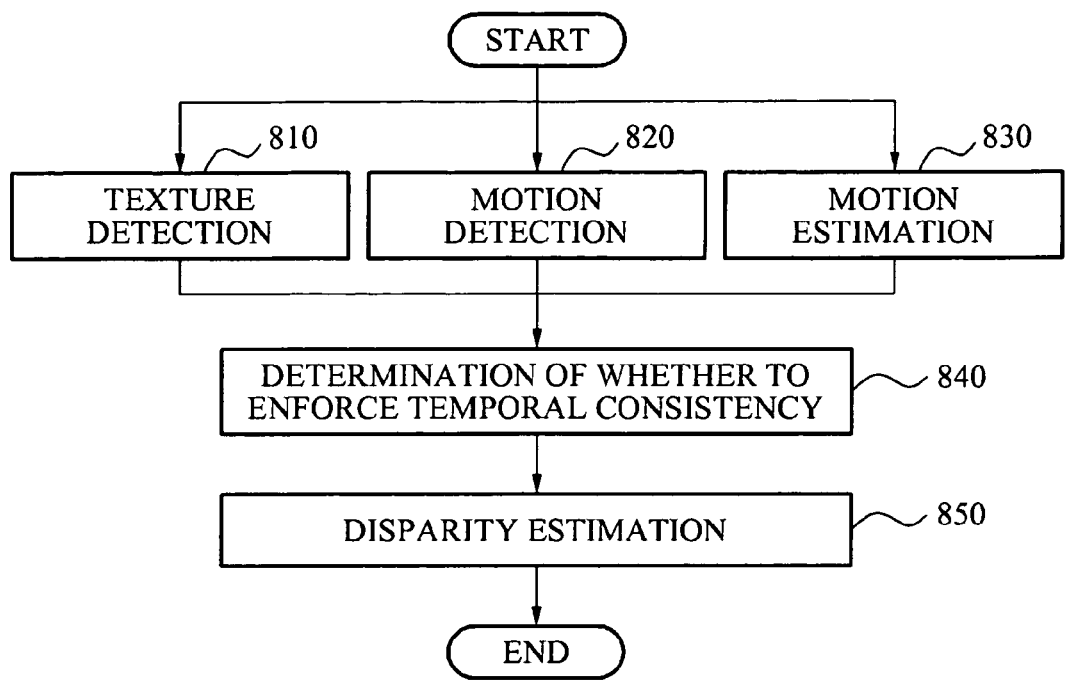
FIG. 8 is a flowchart of an image processing method according to example embodiments.

FIG. 8 illustrates a flowchart of an image processing method according to example embodiments. In operation 810, each of a plurality of pixels in a current frame may be classified into a texture area where a texture is detected, and a non-texture area where a texture is not detected. In operation 820, each of the plurality of pixels in the current frame may be classified into a motion area where motion is detected, and a non-motion area where motion is not detected. In operation 830, each of the plurality of pixels in the current frame may be classified into a matched motion area where motion matched between the current frame and a previous frame is detected, and a non-matched motion area where the matched motion is not detected, through a comparison between the current frame and the previous frame. The above-described operations 810, 820, and 830 may be selectively performed. Accordingly, some of operations 810 through 830 may not be performed. In other words, only some operations 810 through 830 may be performed.

In operation 840, it may be determined whether to enforce a temporal consistency with respect to each of the plurality of pixels in the current frame. In an example, the temporal consistency may be determined to be enforced to pixels classified as the texture area in operation 810, and may be determined not to be enforced to pixels classified as the non-texture area in operation 810, among the plurality of pixels.

In another example, the temporal consistency may be determined to be enforced to pixels classified as the non-motion area in operation 820, and may be determined not to be enforced to pixels classified as the motion area in operation 820, among the plurality of pixels.

In still another example, the temporal consistency may be determined to be enforced to pixels classified as the texture area and the non-motion area in operations 810 and 820, and may be determined not to be enforced to pixels classified as the non-texture area or the motion area, among the plurality of pixels.

In yet another example, the temporal consistency may be determined to be enforced to pixels classified as the matched motion area in operation 830, and may be determined not to be enforced to pixels classified as the non-matched motion area in operation 830, among the plurality of pixels.

In a further example, the temporal consistency may be determined to be enforced to pixels classified as the texture area and the matched motion area in operations 810 and 830, and may be determined not to be enforced to pixels classified as the non-texture area or the non-matched motion area, among the plurality of pixels.

In operation 850, a disparity of each of the plurality of pixels may be estimated based on a result of operation 840. A disparity of a first pixel in the current frame where the temporal consistency is determined to be enforced may be calculated based on a disparity of a second pixel that is contained in the previous frame and that corresponds to the first pixel. The disparity of the first pixel may be the same as the disparity of the second pixel. When the first pixel is contained in the matched motion area, the second pixel may have a same coordinate value in the matched motion area as a coordinate value of the first pixel.

Technical information described above with reference to FIGS. 1 through 7 may be applied equally to example embodiments and accordingly, further descriptions will be omitted.

Generally, a depth of a pixel is inversely proportional to a disparity of the pixel. Accordingly, the disparity described in the example embodiments may also be applied to the depth. The apparatus and method for estimating disparities described according to the example embodiments may also be applied to an apparatus and method for estimating depths.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image processing apparatus to calculate disparities of a plurality of pixels contained in a frame, the image processing apparatus comprising:
    a temporal constraint unit to determine, for each of a plurality of pixels in a current frame, whether to enforce a temporal consistency based on at least one of motion information and texture information; and
    a disparity estimator to estimate disparities of the plurality of pixels by calculating a disparity of each pixel in the current frame where the temporal consistency is determined to be enforced based on the determination result,
    wherein a disparity of a first pixel in the current frame where the temporal consistency is determined to be enforced, is calculated based on a disparity of a second pixel that is in a previous frame and that corresponds to the first pixel,
    wherein the temporal constraint unit determines to enforce the temporal consistency to pixels classified as a texture area where a texture is detected and a non-motion area where motion is not detected, and determines not to enforce the temporal consistency to pixels classified as a non-texture area where a texture is not detected or a motion area where motion is detected, among the plurality of pixels.

2. The image processing apparatus of claim 1, wherein the disparity of the first pixel is the same as the disparity of the second pixel.

3. The image processing apparatus of claim 1, further comprising:
    a texture detector to classify each of the plurality of pixels into the texture area, and the non-texture area and to produce the texture information,
    wherein the temporal constraint unit determines to enforce the temporal consistency to pixels classified as the texture area, and determines not to enforce the temporal consistency to pixels classified as the non-texture area, among the plurality of pixels.

4. The image processing apparatus of claim 1, further comprising:
    a motion detector to classify each of the plurality of pixels into the motion area, and the non-motion area and to produce the motion information,
    wherein the temporal constraint unit determines to enforce the temporal consistency to pixels classified as the non-motion area, and determines not to enforce the temporal consistency to pixels classified as the motion area, among the plurality of pixels.

5. The image processing apparatus of claim 1, further comprising:
    a texture detector to classify each of the plurality of pixels into the texture area, and the non-texture area, and to produce the texture information; and
    a motion detector to classify each of the plurality of pixels into the motion area, and the non-motion area and to produce the motion information.

6. The image processing apparatus of claim 1, wherein each of the plurality of pixels corresponds to a pixel having a same coordinate value as each of the plurality of pixels in the previous frame.

7. The image processing apparatus of claim 1, further comprising:
    a motion estimator to classify each of the plurality of pixels into a matched motion area where motion matched between the frame and the previous frame is detected, and a non-matched motion area where the matched motion is not detected, through a comparison between the frame and the previous frame and to produce the motion information,
    wherein the temporal constraint unit determines to enforce the temporal consistency to pixels classified as the matched motion area, and determines not to enforce the temporal consistency to pixels classified as the non-matched motion area, among the plurality of pixels.

8. The image processing apparatus of claim 7, wherein, when the first pixel is contained in the matched motion area, the second pixel has a same coordinate value in the matched motion area as a coordinate value of the first pixel.

9. An image processing method to calculate disparities of a plurality of pixels contained in a frame, the image processing method comprising:
    determining, for each of a plurality of pixels in a current frame, whether to enforce a temporal consistency based on at least one of motion information and texture information; and
    estimating disparities of the plurality of pixels by calculating a disparity of each pixel in the current frame where the temporal consistency is determined to be enforced based on the determining,
    wherein a disparity of a first pixel in the current frame where the temporal consistency is determined to be enforced is calculated based on a disparity of a second pixel that is in a previous frame and that corresponds to the first pixel,
    wherein the determining comprises determining to enforce the temporal consistency to pixels classified as a texture area where a texture is detected and a non-motion area where motion is not detected, and determining not to enforce the temporal consistency to pixels classified as a non-texture area where a texture is not detected or a motion area where motion is detected, among the plurality of pixels.

10. The image processing method of claim 9, wherein the disparity of the first pixel is the same as the disparity of the second pixel.

11. The image processing method of claim 9, further comprising:
    classifying each of the plurality of pixels into the texture area, and the non-texture area and producing the texture information,
    wherein the determining comprises determining to enforce the temporal consistency to pixels classified as the texture area, and determining not to enforce the temporal consistency to pixels classified as the non-texture area, among the plurality of pixels.

12. The image processing method of claim 9, further comprising:
    classifying each of the plurality of pixels into the motion area, and the non-motion area and producing the motion information,
    wherein the determining comprises determining to enforce the temporal consistency to pixels classified as the non-motion area, and determining not to enforce the temporal consistency to pixels classified as the motion area, among the plurality of pixels.

13. The image processing method of claim 9, further comprising:
    classifying each of the plurality of pixels into the texture area, and the non-texture area and producing the texture information; and classifying each of the plurality of pixels into the motion area, and the non-motion area and producing the motion information.

14. The image processing method of claim 9, wherein, when the first pixel is contained in the matched motion area, the second pixel has a same coordinate value in the matched motion area as a coordinate value of the first pixel.

15. The image processing method of claim 9, further comprising:
classifying each of the plurality of pixels into a matched motion area where motion matched between the frame and the previous frame is detected, and a non-matched motion area where the matched motion is not detected, through a comparison between the frame and the previous frame and producing the motion information,
wherein the determining comprises determining to enforce the temporal consistency to pixels classified as the matched motion area, and determining not to enforce the temporal consistency to pixels classified as the non-matched motion area, among the plurality of pixels.

16. The image processing method of claim 15, wherein, when the first pixel is contained in the matched motion area, the second pixel has a same coordinate value in the matched motion area as a coordinate value of the first pixel.

17. A non-transitory computer readable recording medium storing a program to cause a computer to implement the method of claim 9.

18. An image processing apparatus to calculate disparities of a plurality of pixels contained in a frame, the image processing apparatus comprising:
a temporal constraint unit to determine, for each of a plurality of pixels in a current frame, whether to enforce a temporal consistency based on at least one of motion information and texture information; and
a disparity estimator to estimate disparities of the plurality of pixels by calculating a disparity of each pixel in the current frame where the temporal consistency is determined to be enforced based on the determination result,
wherein a disparity of a first pixel in the current frame where the temporal consistency is determined to be enforced, is calculated based on a disparity of a second pixel that is in a previous frame and that corresponds to the first pixel,
wherein the temporal constraint unit determines to enforce the temporal consistency to pixels classified as a texture area where a texture detected and a matched motion area where motion matched between the frame and the previous frame is detected, and determines not to enforce the temporal consistency to pixels classified as a non-texture area where a texture is not detected or a non-matched motion area where the matched motion is not detected, among the plurality of pixels.

19. The image processing apparatus of claim 18, further comprising:
a texture detector to classify each of the plurality of pixels into the texture area, and the non-texture area and to produce the texture information; and
a motion estimator to classify each of the plurality of pixels into the matched motion area, and the non-matched motion area, through a comparison between the frame and the previous frame and to produce the motion information.

20. An image processing method to calculate disparities of a plurality of pixels contained in a frame, the image processing method comprising:
determining, for each of a plurality of pixels in a current frame, whether to enforce a temporal consistency based on at least one of motion information and texture information; and
estimating disparities of the plurality of pixels by calculating a disparity of each pixel in the current frame where the temporal consistency is determined to be enforced based on the determining,
wherein a disparity of a first pixel in the current frame where the temporal consistency is determined to be enforced is calculated based on a disparity of a second pixel that is in a previous frame and that corresponds to the first pixel,
wherein the determining comprises determining to enforce the temporal consistency to pixels classified as a texture area where a texture detected and a matched motion area where motion matched between the frame and the previous frame is detected, and determining not to enforce the temporal consistency to pixels classified as a non-texture area where a texture is not detected or a non-matched motion area where the matched motion is not detected, among the plurality of pixels.

21. The image processing method of claim 20, further comprising:
classifying each of the plurality of pixels into the texture area, and the non-texture area and producing the texture information; and
classifying each of the plurality of pixels into the matched motion area, and the non-matched motion area, through a comparison between the frame and the previous frame and producing the motion information.

* * * * *